United States Patent [19]

Tsuzuku et al.

[11] Patent Number: 4,478,902
[45] Date of Patent: Oct. 23, 1984

[54] SCREEN FOR PROJECTION TELEVISION

[75] Inventors: Susumu Tsuzuku, Tokyo; Yasuo Hira, Fujisawa; Masao Gotoh, Yokosuka; Hitoshi Yokono, Katsuta; Yoshihisa Hosoe, Yokohama, all of Japan

[73] Assignee: Hitachi, Ltd., Tokyo, Japan

[21] Appl. No.: 298,348

[22] Filed: Sep. 1, 1981

[30] Foreign Application Priority Data

Sep. 4, 1980 [JP] Japan .................................. 55-121770

[51] Int. Cl.$^3$ .................. G03B 21/56; B32B 5/14; B32B 5/20; B32B 7/12
[52] U.S. Cl. .................................... 428/174; 350/117; 350/125; 428/317.1; 428/318.8
[58] Field of Search ............... 350/117, 125, 123, 129; 428/304.4, 318.4, 319.1, 317.1, 317.7, 317.5, 318.8, 310.5, 174, 912.2; 264/46.4, 46.6, 45.5, DIG. 83, 1.9

[56] References Cited

U.S. PATENT DOCUMENTS 3,072,582  1/1963  Frost ................................ 521/164
3,091,551  5/1963  Robertson ........................ 428/174

FOREIGN PATENT DOCUMENTS 2845631  4/1980  Fed. Rep. of Germany ... 428/318.8
51-124925 10/1976  Japan .
43974  4/1979  Japan ............................ 428/319.1

Primary Examiner—William J. Van Balen
Attorney, Agent, or Firm—Antonelli, Terry & Wands

[57] ABSTRACT

A screen for projection television set comprising a foamed support and a reflective film adhered to the concave side of the support, said support having the outer layers with a high density such as 0.7 to 1.2 g/cm$^3$ and the inner portion with a low density so as to make the density of the foamed support as a whole 0.2 to 0.5 g/cm$^3$, has good projection properties, surface hardness with sufficiently strong support. When said support is foam molded by using a polyurethane having special polyol components, its heat resistance is remarkably increased and can be foam molded at high temperatures without deformation.

16 Claims, 4 Drawing Figures

SCREEN FOR PROJECTION TELEVISION

BACKGROUND OF THE INVENTION

This invention relates to a screen for projection television set obtained by adhering a reflective film to a foamed article and a process for producing the same.

Screens for projection television sets comprise a thick plate-like support slightly curved and a reflective film made of a metal thin film or the like adhered to the concave side of said support. The supports are usually made from urethane foams, glass cloth-reinforced polyester laminates as disclosed in Japanese Patent Application Kokoku (Post-Exam Publn) No. 124925/76, or the like. But when glass cloth-reinforced polyester laminates are used, productivity of the screens is lowered due to elaborate and time-consuming laminating operation of glass cloth and curing of polyester resin. On the other hand, when urethane foams are used as the support, the productivity may be increased but the surface hardness of the support becomes insufficient due to the foaming structure, which results in easily causing deformation or scratching of the reflective film adhered to said support due to outer actions. When such deformation and scratching are produced on the reflective film, projection properties of the screen is undesirably lowered. When a degree of foaming of the foamed article which is used as a support is reduced, the surface hardness of the support may be increased while the weight of the support may be increased, which results in undesirably increasing the raw material cost and becoming expensive.

SUMMARY OF THE INVENTION

It is an object of this invention to provide a screen for projection television set comprising a support and a reflective film adhered to said support wherein the surface hardness of said support is increased so as to prevent the reflective film from deformation and damages such as scratching and to increase projection properties, while making the weight of the screen lighter and the production cost less expensive by increasing productivity. It is another object of this invention to provide a process for producing such a screen for projection television set. Other objects and advantages of this invention will be apparent from the following explanations.

This invention provides a screen for projection television set comprising a thick plate-like support slightly curved and made from a foamed article and a reflective film made of a metal thin film and adhered to the concave side of said support, characterized in that the outer layers of said support have a high density so as to give sufficient surface hardness and the inner portion (core) of said support has a low density so as to make the density of the support as a whole 0.2 to 0.5 g/cm$^3$.

BRIEF DESCRIPTION OF THE DRAWINGS

In the attached drawing.

DESCRIPTION OF THE PREFERRED EMBODIMENTS

The projection television screen of this invention is characterized by having the foamed support wherein the outer layer has a higher density than the inner portion (i.e., a core) without increasing the weight of the support but increasing the surface hardness in order to enhance projection properties.

Figure 2:
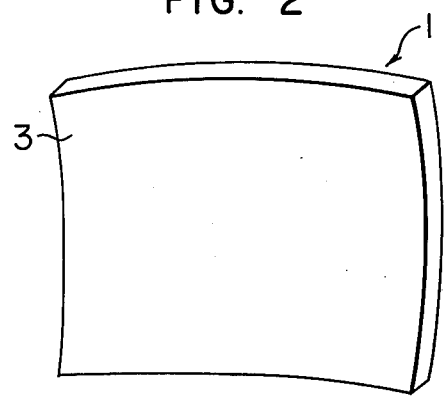
FIG. 2 is a perspective view of a screen for projection television set of this invention.
Figure 3:
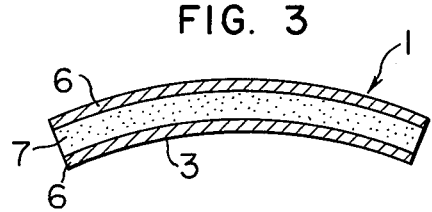
FIG. 3 is a cross-sectional view of the central portion taken horizontally of the screen of FIG. 2.

The density of the outer layer is preferably in the range of about 0.7 to 1.2 g/cm$^3$, more preferably 0.9 to 1.1 g/cm$^3$, since a reflective film is formed on the concave side of the support as shown in FIGS. 2 and 3 and said reflective film should show good projection properties. The density of the outer layer is measured by taking the outer layer in 0.5 mm thick from the surface. On the other hand, the density of the core should be lower than that of the outer layer so as to make the density of the support as a whole about 0.2 to 0.5 g/cm$^3$. By making the density of the support as a whole about 0.2 to 0.5 g/cm$^3$, the raw material cost can be decreased, while increased strength can be obtained by making the density of the outer layer as high as 0.7 to 1.2 g/cm$^3$.

The foamed support is made from a polyurethane foaming composition and when that having higher heat resistance is required, a polyurethane foaming composition having a special polyol component is used.

The projection television screen of this invention can be produced by collision mixing a polyisocyanate solution (B solution) and a solution comprising a polyol (or polyhydroxy compound), a low-boiling solvent as a blowing agent and one or more additives (A solution), the amount of the low-boiling solvent being preferably 5 to 50 parts by weight based on 100 parts by weight of the polyol, pouring the mixed solutions A and B into a mold wherein a reflective film has been placed and sticked to either an upper or lower mold and conducting foam molding.

As mentioned above, it is necessary to make the density of the outer layers of the support higher than that of the core of the support. When water is used as a blowing agent, the water reacts with the polyisocyanate to generate carbon dioxide gas, that is, a chemical foaming is conducted, to give a foamed article having a nearly uniform density as a whole. Therefore, the use of water is not preferable to make density difference between the outer layers and the core of the support. On the other hand, when a low-boiling solvent is used as a blowing agent, since the reaction heat between the polyisocyanate and the polyol is used for vaporization of the low-boiling solvent and the reaction heat is removed by the mold at the surface portion of the foam molded article, it is very difficult to conduct foaming at the surface portion of the molded article, which results in making the density of the outer layers higher than that of the core of the support. The low-boiling solvent is used in this invention in an amount of preferably 5 to 50 parts by weight, more preferably 10 to 30 parts by weight based on 100 parts by weight of the polyol component. The foaming by using water has a defect in lowering the density of the outer layer of the support as mentioned above, but when water is used in a small amount, it shows an effect of preventing the surface portion of the support from forming voids thereon. Therefore, it is preferable to use water in an amount of 0.05 to 1.0 part by weight based on 100 parts by weight of the polyol together with the low-boiling solvent to give a high density and smooth screen surface. Further, when the low-boiling solvent is compounded in excess, voids are produced on the surface of the foamed support, which results in lowering in projection properties of the reflective film due to unevenness of the surface. Therefore it is necessary to mix the low-boiling solvent in an amount of not more than 50 parts by weight based on 100 parts by weight of the polyol component.

The temperature of the mold also influences the density of the outer layer of the foamed support and strength of the foamed support. Therefore, in order to produce the foamed support having the higher surface density (i.e., higher density in the outer layer of the support) and sufficient strength as a support for the projection screen by accelerating the reaction of the polyol component, it is preferable to maintain the mold temperature at 30 to 80° C. preferably 60°–80° C.

As the polyisocyanates used for giving the B solution, there can be used 4,4'-diphenylmethane diisocyanate (hereinafter referred to as "MDI"), crude MDI, hexamethylene diisocyanate, tolylene diisocyanate (TDI), crude TDI, polyhenylenepolymethylene polyisocyanate (PAPI), isophorone diisocyanate, and the like. These polyisocyanates can be used alone or as a mixture thereof.

As the polyols (one component in the A solution), there can be used alkylene oxide (ethylene oxide, propylene oxide, etc.,) adducts of alcohols such as glycerin, diglycerin, pentaerythritol, trimethylolpropane, ethylene glycol, propylene glycol, 1,4-polybutadiene glycol, bisphenol A, bisphenol F, sorbitol, etc.; an alkylene oxide adduct of sucrose; alkylene oxide adducts of amines such as 4,4'-diaminodiphenylmethane, ethylenediamine, tolyleneamine, monoethanolamine, diethanolamine, triethanolamine; polyester polyols obtained from a dicarboxylic acid or an anhydride thereof such as phthalic acid, adipic acid, etc., and a polyhydric alcohol such as ethylene glycol, propylene glycol, etc. These polyols can be used alone or as a mixture thereof.

When as the polyol the following special polyol components comprising (a), (b) and (c) are used and foam molded at a temperature of 60° to 80° C., there can be obtained a foamed support having higher heat resistance without causing deformation after molding even though foam molded under such a higher molding temperature.

Figure 4:
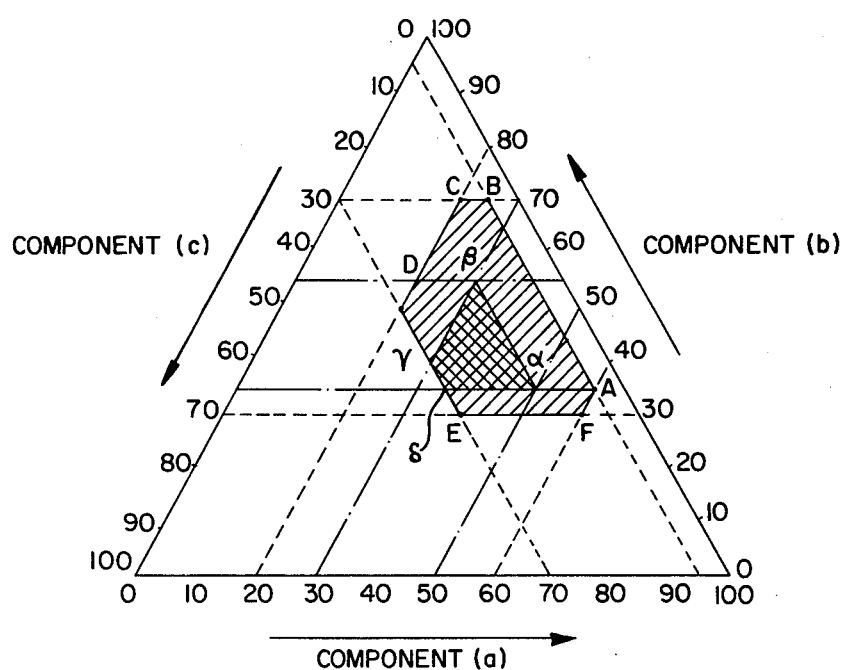
FIG. 4 is a triangular diagram of the three components (a), (b) and (c) used as the polyol in the foaming reaction mixture, showning the closed area A-B-C-D-E-F-A and the closed area $\alpha$-$\beta$-$\gamma$-$\delta$-$\alpha$ for the proportions of such components (a), (b) and (c) as the polyol in the foaming reaction mixture.

Such special polyol components are as follows:
(a) an alkylene oxide adduct of 4,4'-diaminodiphenylmethane having an OH (hydroxyl) value of 280–600 KOH mg/g and having the following formula:

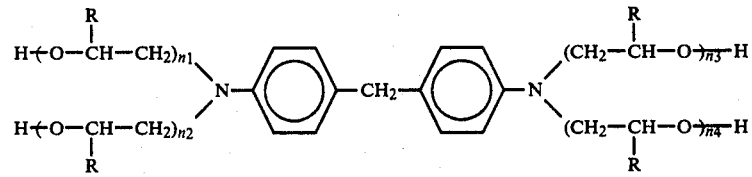

wherein R is H or $CH_3$; and $3 \leq n_1 + n_2 + n_3 + n_4 \leq 15$, (b) an aliphatic polyol having an OH value of 450–800 KOH mg/g and 3 or 4 OH groups in the molecule, and (c) a polyol having an OH value of 30 to 100 KOH mg/g and 2 or 3 OH groups in the molecule, the proportions of these components (a) to (c) being in the closed area of A-B-C-D-E-F-A, preferably α-β-γ-δ-α in a triangular diagram (see FIG. 4) taking each component (a), (b) or (c) at each vertex of a triangle, wherein the points A to F and α to δ have the following compositions in percents by weight:

| Points | Component (a) | Component (b) | Component (c) |
|---|---|---|---|
| A | 60 | 35 | 5 |
| B | 25 | 70 | 5 |
| C | 20 | 70 | 10 |
| D | 20 | 50 | 30 |
| E | 40 | 30 | 30 |
| F | 60 | 30 | 10 |
| α | 50 | 35 | 15 |
| β | 30 | 55 | 15 |
| γ | 30 | 40 | 30 |
| δ | 35 | 35 | 30 |

The polyols of the component (a) can be produced by adding an alkylene oxide such as propylene oxide, ethylene oxide, or the like to 4,4'-diaminodiphenylmethane in the presence of an acid or alkali catalyst. The polyols of the component (a) can be used alone or as a mixture thereof. The OH value of said polyol can be changed by controlling the adding amount of alkylene oxide such as ethylene oxide or propylene oxide at the time of the synthesis.

The polyols of the component (b) include alkylene oxide (e.g., ethylene oxide, propylene oxide, etc.,) adducts of aliphatic alcohols having 3 or 4 hydroxyl groups in the molecule such as glycerin, diglycerin, pentaerythritol, trimethylolpropane, and the like; alkylene oxide (e.g., ethylene oxide, propylene oxide, etc.,) adducts of aliphatic amines, such as ethylenediamine, monoethanolamine, diethanolamine, triethanolamine, etc. These polyols of the component (b) can be used alone or as a mixture thereof. The OH value of said polyol can be changed by controlling the adding amount of the alkylene oxide at the time of synthesis as in the case of the component (a).

The polyols of the component (c) include alkylene oxide (e.g., ethylene oxide, propylene oxide, etc.,) adducts of compounds having 2 or 3 active hydrogens in the molecule such as alcohols, e.g. glycerin, ethylene glycol, propylene glycol, trimethylolpropane, bisphenol A, bisphenol F, etc.; amines, e.g. monoethanolamine, diethanolamine, triethanolamine, etc.; and water. These polyols of the component (c) can be used alone or as a mixture thereof. The OH value of said polyol can be changed to a desired value by adjusting the adding amount of alkylene oxide such as propylene oxide, ethylene oxide to the above-mentioned initiator (the compound having active hydrogen) at the time of synthesis as in the case of the component (a).

The polyol mixture containing the components (a) to (c) used in this invention can be obtained by mixing individual components (a) to (c) synthesized separately at the time of use. The polyol mixture can also be obtained by mixing a polyol mixture containing the components (a) and (b) which is synthesized at a time by adding an alkylene oxide such as ethylene oxide or propylene oxide to a mixture, for example, of aniline-formaldehyde condensate and glycerin, with another polyol component (c). The important thing is that the polyol mixture should have the components (a) to (c) in the range defined by the closed area of A-B-C-D-E-F-A, more preferably the closed area of $\alpha$-$\beta$-$\gamma$-$\delta$-$\alpha$, at the time of use and the production method thereof is not limited so as to give the desired rigid polyurethane foams.

The mixing ratio of said polyisocyanate to said polyol mixture is preferably in the range of 0.95–1.30/1 in terms of isocyanate index (a measure of the isocyanate/polyol equivalent ratio).

In the above-mentioned case of using the special polyol components (a), (b) and (c), since the foam molding temperature is so high that the conversion of the polyisocyanate and the polyol is remarkably increased and unreacted isocyanate groups are hardly retained in the foamed support for projection screen. In a conventional projection screen, there often takes place peeling of a reflective film from a screen support due to a gas stored between the reflective film and the screen support, said gas (carbon dioxide) having been generated by the reaction between the unreacted isocyanate groups present in the formed support and water penetrated into the support from outer atmosphere during the use of said screen. According to this invention such peeling hardly takes place since the component (a), e.g., a propylene oxide adduct of 4,4'-diaminodiphenylmethane, the component (b), e.g., a propylene oxide adduct of monoethanolamine, and the component (c), e.g., a propylene oxide adduct of glycerin, are used as the polyol in a limited proportion as mentioned above.

As the low-boiling solvent, there can be used conventional ones such as halogenated hydrocarbons having low boiling points (e.g., 20°–100° C.), e.g., trichloromonofluoromethane, dichlorodifluoromethane, methylene chloride, trichlorotrifluoroethane, tetrachlorodifluoroethane, etc. These low-boiling solvents can be used alone or as a mixture thereof. When trichloromonofluoromethane is used as the low-boiling solvent, since the boiling point is 23.8° C. which is almost equal to room temperature, shrinkage of the foamed article becomes remarkably small and deformation of the projection screen hardly takes place, which results in giving the projection screen having high dimensional accuracy in curved portions.

As the additives, there can be used one or more catalysts for promoting the foaming reaction between the polyisocyanate and the polyol, e.g., tertiary amines such as triethylenediamine, dimethylamine, diethanolamine, N-methylpiperadine, etc.; tin compounds such as dibutyl tin dilaurate, dibutyl tin acetate, tin octoate, etc.; foam stabilizers such as various alkylene oxide modified polydimethylsiloxanes, alkylene oxide modified fluorinated hydrocarbons; organic or inorganic fillers, pigments, dyes, fire retardants, antioxidants, and the like.

As the reflective film, there can be used various films which have sufficient light reflectivity made of metal films, such as aluminum foil, tin foil, vacuum evaporated aluminum film, etc.

The solution A comprising a polyol, a low-boiling solvent and one or more additives and the solution B containing a polyisocyanate can be collision mixed in a conventionally used high pressure foaming machine. The resulting mixture is poured into a mold heated at a temperature of 30° to 80° C. fixed in a high pressure foaming machine conventionally used for forming urethane foams. Either upper or lower side of the mold has been fixed a reflective film thereon by a conventional method, for example, by using a tool such as a fixing frame or by sticking a reflective film to the inner surface of either upper or lower side of the mold by exhausting the inner gas from various small pores formed on the upper or lower side of the mold before the pouring of the foaming mixture. Further, when one side of the reflective film on which the foamed support is to be adhered to is treated with a primer such as silane coupling agent, epoxy resin, etc., or coated with an adhesive such as isoprene rubber adhesives, polyurethane resin adhesives, etc., the bonding between the reflective film and the foamed support is desirably increased.

This invention is illustrated by way of the following Examples, in which all percents and parts are by weight unless otherwise specified.

EXAMPLES 1 to 15

Figure 1:
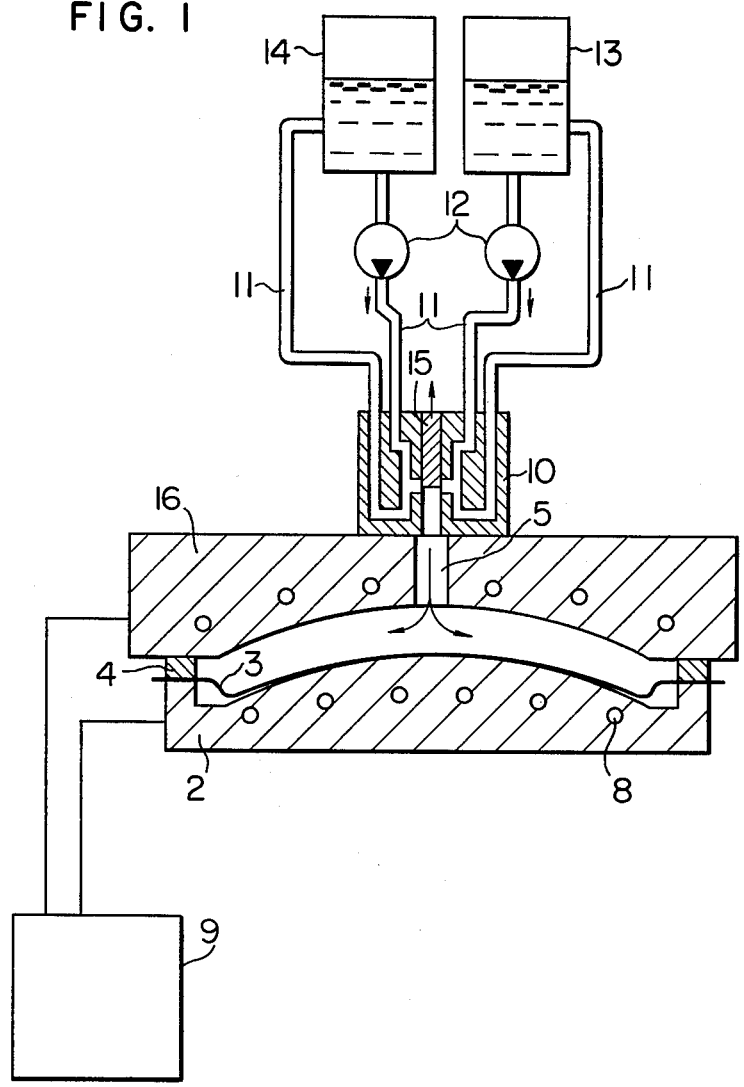
FIG. 1 is a cross-sectional view of a foam molding apparatus as one example suitable for producing a screen for projection television set of this invention.

Screens for projection television sets having curved portions as shown in FIGS. 2 and 3 were produced by using a high pressure foaming machine as shown in FIG. 1.

In FIG. 1, numeral 16 denotes an upper side mold (top force) and numeral 2 denotes a lower side mold (bottom force) the surface of which is covered with an aluminum foil 3, a reflective film, and fixed with a fixing frame 4. The mold is maintained at a constant temperature by a mold temperature adjustment 9 while passing a warm water through temperature controlling warm water pipes 8 formed in the top force 16 and the bottom force 2. The high pressure foaming machine comprises major essential elements of a mixing head 10, a liquid recycling pipe 11, a pump 12, an A solution tank 13 and a B solution tank 14. The high pressure foaming is conducted by sending a solution A comprising a polyol, a low-boiling solvent as major components sent from the A solution tank 13 by a pump 12 and a solution B containing a polyisocyanate sent from the B solution tank 14 by a pump 12 to mixing heads 10, wherein the solution A and solution B are collision mixed by moving a change-over piston for recycling and mixing the raw material solutions at a direction shown by an arrow, and pouring the resulting collision mixed foaming reaction mixture obtained by mixing the solution A and the solution B through an inlet 5 to the space formed by the top force 16 and the bottom force 2. After pouring, the reaction was conducted for 10 minutes. Subsequently the resulting foamed article is taken out from the mold and superfluous edges are cut to give a projection television screen 1 as shown in FIGS. 2 and 3 comprising the aluminum foil 3 adhered to the concaved outer layer 6 of the foamed support and the foamed support having the outer layer 6, 6 and core 7 having a length of 75.6 cm, a width of 105 cm, a thickness of 0.8 cm and a curvature radius of 300 cm.

The thickness of the aluminum foil used was 30 $\mu$m. The foaming reaction mixtures were obtained by collision mixing a solution A containing a polyol mixture, low-boiling solvent or solvents and additives (a catalyst, a foam stabilizer and water) and a solution B containing a polyisocyanate as shown in Tables 1 and 4 (in parts by weight) in the above-mentioned high pressure foaming machine. The temperature of the solutions A and B was 20° C. according to a conventional technique. The foaming reaction mixture was poured in an amount of 2600 g and the mold temperature was maintained at 50° C. except for Examples 8 to 10.

TABLE 1

| Solution | Composition (parts) | Example No. 1 | 2 | 3 | 4 | 5 | 6 | 7 |
|---|---|---|---|---|---|---|---|---|
| A | POLYOLS | | | | | | | |
| | PO adduct of ethylenediamine (OH value: 540 KOH mg/g) | 100 | 100 | — | — | — | — | — |
| | PO adduct of monoethanolamine (OH value: 770 KOH mg/g) | — | — | — | — | 50 | 50 | 50 |
| | PO adduct of sorbitol (OH value: 580 KOH mg/g) | — | — | 100 | 100 | — | — | — |
| | PO adduct of 4,4'-diamino-diphenylmethane (OH value: 430 KOH mg/g) | — | — | — | — | 40 | 40 | 40 |
| | PO and EO adduct of glycerin (OH value: 620 KOH mg/g, EO/PO = 1.33/1 in molar ratio) | — | — | — | — | 10 | 10 | 10 |
| | SOLVENTS | | | | | | | |
| | Trichloromonofluoromethane b.p. 23.8° C. (1 atm) | 6 | 20 | 10 | 20 | 8 | 20 | 40 |
| | Trichlorotrifluoroethane b.p. 47.6° C. (1 atm) | — | — | — | — | — | 10 | — |
| | CATALYST | | | | | | | |
| | Triethylenediamine | 4 | 4 | 4 | 4 | 4 | 4 | 4 |
| | FOAM STABILIZER | | | | | | | |
| | Alkylene oxide modified polydimethylsiloxane | 1 | 1 | 1 | 1 | 1 | 1 | 1 |
| | Water | 0.5 | 0.5 | 0.5 | 0.5 | 0.5 | 0.5 | — |
| B | Crude MDI (NCO content: 31.5%) | 131 | 131 | 133 | 133 | 145 | 145 | 145 |

(Note)
PO = Propylene oxide, EO = Ethylene oxide,
MDI = 4,4'-Diphenylmethane diisocyanate

TABLE 2

| Properties | Example No. 1 | 2 | 3 | 4 | 5 | 6 | 7 |
|---|---|---|---|---|---|---|---|
| Density of foamed support as a whole (g/cm$^3$) | 0.4 | 0.4 | 0.4 | 0.4 | 0.4 | 0.4 | 0.4 |
| Surface density of foamed support *1 (g/cm$^3$) | 0.80 | 1.00 | 0.82 | 0.96 | 0.80 | 1.00 | 1.09 |
| Core density of foamed support (g/cm$^3$) | 0.15 | 0.10 | 0.13 | 0.12 | 0.15 | 0.10 | 0.08 |
| Ratio of surface density to core density | 5.3/1 | 10/1 | 6.3/1 | 8/1 | 5.3/1 | 10/1 | 13.6/1 |
| Pencil hardness of reflective surface | H | 2H | H | 2H | H | 2H | 3H |
| Bending strength of foamed support (kg/cm$^2$) | 150 | 190 | 155 | 200 | 160 | 200 | 200 |

(Note)
*1: Density of outer layer of 0.5 mm thick from the surface (The conditions are the same in the following Examples.)
Mold temperature: 50° C.

TABLE 3

| Properties | Example No. 8 | 6 | 9 | 10 |
|---|---|---|---|---|
| | Mold temperature (°C.) 30 | 50 | 60 | 80 |
| Density of foamed support as a whole (g/cm$^3$) | 0.4 | 0.4 | 0.4 | 0.4 |
| Surface density of foamed support (g/cm$^3$) | 1.05 | 1.00 | 0.95 | 0.90 |
| Core density of foamed support (g/cm$^3$) | 0.09 | 0.10 | 0.12 | 0.13 |
| Ratio of surface density to core density | 11.6/1 | 10/1 | 7.9/1 | 6.9/1 |
| Pencil hardness of reflective surface | 2H | 2H | 2H | 2H |
| Bending strength of foamed support (kg/cm$^2$) | 170 | 200 | 200 | 190 |

TABLE 4

| Solution | Composition | Example No. 11 | 12 | 13 | 14 | 15 |
|---|---|---|---|---|---|---|
| A | POLYOLS | | | | | |
| | PO adduct of 4,4'-diaminodiphenyl methane (OH value: 430 KOH mg/g) | 40 | 40 | 40 | 40 | 40 |
| | PO and EO adduct of glycerin (OH value: 62 KOH mg/g EO/PO = 1.33/1 in molar ratio) | 10 | 10 | 10 | 10 | 10 |
| | PO adduct of monoethanolamine (OH value: 770 KOH mg/g) | 50 | 50 | 50 | 50 | 50 |
| | SOLVENT | | | | | |
| | Trichlorotrifluoroethane b.p. 47.6° C. (1 atm) | — | 2 | 3 | 3 | 4 |
| | CATALYST | | | | | |
| | Triethylenediamine | 4 | 4 | 4 | 4 | 4 |

TABLE 4-continued

| Solution | | Example No. | | | | |
|---|---|---|---|---|---|---|
| | | 11 | 12 | 13 | 14 | 15 |
| | FOAM STABILIZER | | | | | |
| | Alkylene oxide modified polydimethylsiloxane | 1 | 1 | 1 | 1 | 1 |
| | Water | 1.0 | 1.5 | 2.0 | 1.0 | 1.5 |
| B | Crude MDI (NCO content: 31.5%) | 145 | 145 | 145 | 145 | 145 |

(Note)
PO = Propylene oxide
EO = Ethylene oxide
MDI = 4,4'-Diphenylmethane diisocyanate

TABLE 5

| Properties | Example No. | | | | |
|---|---|---|---|---|---|
| | 11 | 12 | 13 | 14 | 15 |
| Density of foamed support as a whole (g/cm$^3$) | 0.4 | 0.4 | 0.4 | 0.4 | 0.4 |
| Surface density of foamed support (g/cm$^3$) | 0.46 | 0.52 | 0.54 | 0.55 | 0.54 |
| Core density of foamed support (g/cm$^3$) | 0.38 | 0.36 | 0.34 | 0.34 | 0.34 |
| Ratio of surface density to core density | 1.2/1 | 1.4/1 | 1.6/1 | 1.6/1 | 1.6/1 |
| Pencil hardness of reflective surface | 2B | B | B | B | B |
| Bending strength of foamed support (kg/cm$^2$) | 150 | 150 | 155 | 155 | 160 |

(Note)
Mold temperature: 50° C.
Examples 11 to 15 are comparative examples.

As shown in Table 1, in Example 1, the solution A was prepared by using 100 parts of propylene oxide adduct of ethylenediamine having an OH value of 540 KOH mg/g as a polyol, 6 parts of trichloromonofluoromethane having a boiling point of 23.8° C. under 1 atm as a low-boiling solvent, 4 parts of triethylenediamine as a catalyst, 1 part of alkylene oxide modified polydimethylsiloxane as a foam stabilizer and 0.5 part of water, and the solution B was prepared by using 131 parts of crude MDI having NCO content of 31.5%.

Foaming reaction mixtures used in Examples 2 to 7 and 11 to 15 were as shown in Tables 1 and 4, respectively.

By using these foaming reaction mixtures, screens for projection television sets as shown in FIGS. 2 and 3 were produced by using the high pressure foaming machine of FIG. 1 as mentioned above. Densities of foamed supports as a whole, those of the surface portion (0.5 mm thick from the surface) and those of the core portion of the foamed supports and bending strength of the foamed supports (according to ASTM D-790) and pencil hardness of the reflective surface of aluminum foil were measured. The results are as shown in Table 2 (Examples 1 to 7), Table 3 (Examples 6 and 8 to 10, by changing the mold temperature) and Table 5 (Examples 11 to 15 for comparison).

As is clear from the above results, in Examples 1 to 7, since the low-boiling solvent is used in an amount of 5 parts or more based on 100 parts of the polyol, there are obtained projection screens having desirable properties, that is, the densities of foamed supports as a whole being good, the surface densities being 0.8 to 1.09 g/cm$^3$, the pencil hardness of the reflective surfaces being H or more harder, the bending strength of foamed support being 150 kg/cm$^2$ or more.

Further, effects of changing the mold temperatures from 30° C. to 80° C. were measured as to the foaming reaction mixture used in Example 6. The results are as shown in Table 3. As shown in Table 3, screens for projection television sets having good properties are obtained at the mold temperatures of 30° C. to 80° C.; that is, the surface density being 0.9 to 1.05 g/cm$^3$, the pencil hardness of the reflective surface being as hard as 2H, and the bending strength being as good as 170–200 kg/cm$^2$. When the mold temperature was lower than 30° C., the time required for foam molding was prolonged, the bending strength of the foamed support was decreased and the resulting screen was not suitable for practical use. On the other hand, when the mold temperature was higher than 80° C., the resulting foamed support was deformed when taken out of the mold, and thus the resulting screen was not suitable for practical use.

In the case of Examples 11 to 15 (comparison), the low-boiling solvent was used less than 5 parts per 100 parts of the polyol. Thus, the resulting foamed supports are satisfactory in the density as a whole and the bending strength, but not satisfactory in the surface density (less than 0.55 g/cm$^3$) and the pencil hardness of the reflective surface (not so hard as HB).

The foaming reaction mixtures of Examples 5 to 7 belong to the special polyurethane foaming composition having a special polyol mixture; that is

| | |
|---|---|
| PO adduct of monoethanolamine (OH value: 770 KOH mg/g) 50 parts | the component (b) having OH value of 450–800 KOH mg/g 30–70 parts |
| PO adduct of 4,4'-diaminodiphenylmethane (OH value: 430 KOH mg/g) 40 parts | the component (a) having OH value of 280–600 KOH mg/g 20–60 parts |
| PO and EO adduct of glycerin (OH value: 620 KOH mg/g) 10 parts | the component (c) having OH value of 30–100 KOH mg/g 5–30 parts |

Therefore, the resulting polyurethane has high heat resistance and can be molded at such high mold temperatures as 60° to 80° C. without deformation as shown in Table 3 (the same results can also be expected in the foaming reaction mixtures used in Examples 5 and 7). Further, the resulting screens obtained in Examples 8 to 10 were particularly excellent in preventing the peeling of the reflective film. In addition, when the foaming reaction mixtures having the special polyol mixtures as mentioned above are used, the resulting screens are also excellent in impact strength, which is very convenient for transportation of the screens for projection television sets.

As mentioned above, according to this invention, there can be produced screens for projection television sets having reflective surfaces with high surface hardness and foamed support strongly bonded to the reflective film with sufficient strength by a oneshot process. Therefore, the screens can be produced with high productivity with low production cost without using special apparatus.

What is claimed is:

1. In a screen for projection television set comprising a thick plate-like support slightly curved and a reflective film adhered to the concave side of said support, the improvement wherein said support is made of a formed article having an inner portion and outer layer at the sides of the inner portion, the outer layers of said support having a high density so as to give sufficient surface hardness to the reflective film and the inner portion of said support having a low density so as to make the density of said support as a whole very low, wherein the support is made from a foaming reaction mixture comprising a polyisocyanate, a polyol, a low-boiling solvent as a blowing agent and one or more additives, the amount of the low-boiling solvent being 5 to 50 parts by weight based on 100 parts by weight of the polyol, and wherein the foaming reaction mixture contains as the polyol (a) an alkylene oxide adduct of 4,4'-diaminodiphenylmethane having an OH value of 280 to 600 KOH mg/g, (b) an aliphatic polyol having an OH value of 450–800 KOH mg/g and 3 or 4 OH groups in the molecule, and (c) a polyol having an OH value of 30 to 100 KOH mg/g and 2 or 3 OH groups in the molecule, the proportions of these components (a) to (c) being in the closed area of A-B-C-D-E-F-A in a triangular diagram taking each component (a), (b) or (c) at respective vertices of a triangle, the points A to F having the following compositions in percents by weight:

| Points | Component (a) | Component (b) | Component (c) |
|--------|---------------|---------------|---------------|
| A | 60 | 35 | 5 |
| B | 25 | 70 | 5 |
| C | 20 | 70 | 10 |
| D | 20 | 50 | 30 |
| E | 40 | 30 | 30 |
| F | 60 | 30 | 10 |

2. A screen according to claim 1, wherein the foaming reaction mixture comprises the proportions of these components (a) to (c) being in the closed area of $\alpha$-$\beta$-$\gamma$-$\delta$-$\alpha$ in a triangular diagram taking each component (a), (b) or (c) at respective vertices of a triangle, the point $\alpha$ to $\delta$ having the following composition in percents by weight:

| Points | Component (a) | Component (b) | Component (c) |
|--------|---------------|---------------|---------------|
| $\alpha$ | 50 | 35 | 15 |
| $\beta$ | 30 | 55 | 15 |
| $\gamma$ | 30 | 40 | 30 |
| $\delta$ | 35 | 35 | 30 |

3. A screen according to claim 1, wherein the amount of the low-boiling solvent is 10-30 parts by weight based on 100 parts by weight of the polyol.

4. A screen according to claim 1, wherein the polyisocyanate is selected from the group consisting of MDI, crude MDI, hexamethylene diisocyanate, TDI, crude TDI, PAPI, isophorone diisocyanate, and mixtures thereof.

5. A screen according to claim 4, wherein the polyisocyanate is crude MDI.

6. A screen according to claim 1, wherein the polyol of component (a) is selected from the group consisting of ethylene oxide adduct of 4,4'-diaminodiphenyl methane and propylene oxide adduct of 4,4'-diaminodiphenylmethane and mixtures thereof.

7. A screen according to claim 6, wherein the component (b) aliphatic polyol is selected from the group consisting of alkylene oxide adducts of aliphatic alcohols having 3 or 4 hydroxyl groups in the molecule, alkylene oxide adducts of aliphatic amines, and mixtures thereof.

8. A screen according to claim 7, wherein the alkylene oxide adduct of aliphatic alcohols having 3 or 4 hydroxyl groups in the molecule is an ethylene oxide or propylene oxide adduct of glycerin, diglycerin, pentaerythritol, or trimethylolpropane; and the alkylene oxide adduct of aliphatic amine is an ethylene oxide or propylene oxide adduct of ethylenediamine, monoethanolamine, diethanolamine, or triethanolamine.

9. A screen according to claim 8, wherein the component (c) polyol is selected from the group consisting of alkylene oxide adducts of compounds having 2 or 3 active hydrogens selected from the group consisting of alcohols, amines and water and mixtures thereof.

10. A screen according to claim 9, wherein the alcohols having 2 or 3 active hydrogens are selected from the group consisting of glycerin, ethylene glycol, propylene glycol, trimethylolpropane, bisphenol A, and bisphenol F; and the amines having 2 or 3 hydrogens are selected from the group consisting of monoethanolamine, diethanolamine and triethanolamine.

11. A screen according to claim 1, wherein said foaming reaction mixture comprises said polyisocyanate and said polyol in a mixing ratio in the range of 0.95-1.30/1 in terms of isocyanate index.

12. A screen according to claim 1, wherein the reflective film has on its surface adjacent to the support a layer of primer or adhesive to increase the bonding between the reflective film and the support.

13. A screen according to claim 5, wherein the polyol of component (a) is propylene oxide adduct of 4,4'-diaminodiphenylmethane, the polyol of component (b) is propylene oxide adduct of monoethanolamine, and the polyol of component (c) is a mixture of propylene and ethylene oxide adducts of glycerin.

14. A screen according to claim 1, wherein the density of the support as a whole is 0.2 to 0.5 g/cm$^3$ and the density of the outer layer is 0.7 to 1.2 g/cm$^3$.

15. A screen according to claim 1, wherein the foaming reaction mixture contains water in an amount of 0.05 to 1.0 part by weight based on 100 parts by weight of the polyol.

16. A screen according to claim 1, wherein the component (a) is propylene oxide adduct of 4,4'-diaminodiphenylmethane, the component (b) is propylene oxide adduct of monoethanolamine, and the component (c) is propylene oxide and ethylene oxide adduct of glycerin.

* * * * *